(12) United States Patent
Redburn

(10) Patent No.: US 12,203,593 B2
(45) Date of Patent: Jan. 21, 2025

(54) ACCESSORY ATTACHMENT SYSTEM AND METHOD

(71) Applicant: Keith Redburn, Bay City, MI (US)

(72) Inventor: Keith Redburn, Bay City, MI (US)

( * ) Notice: Subject to any disclaimer, the term of this patent is extended or adjusted under 35 U.S.C. 154(b) by 0 days.

(21) Appl. No.: 18/107,003

(22) Filed: Feb. 7, 2023

(65) Prior Publication Data
US 2023/0265966 A1   Aug. 24, 2023

Related U.S. Application Data

(63) Continuation-in-part of application No. 17/850,634, filed on Jun. 27, 2022, which is a continuation-in-part of application No. 17/696,604, filed on Mar. 16, 2022.

(60) Provisional application No. 63/307,444, filed on Feb. 7, 2022, provisional application No. 63/215,275, filed on Jun. 25, 2021, provisional application No. 63/161,876, filed on Mar. 16, 2021.

(51) Int. Cl.
| | | |
|---|---|---|
| *F16M 13/02* | (2006.01) | |
| *B63B 17/00* | (2006.01) | |
| *E02B 3/06* | (2006.01) | |

(52) U.S. Cl.
CPC ............ *F16M 13/02* (2013.01); *B63B 17/00* (2013.01); *E02B 3/06* (2013.01)

(58) Field of Classification Search
CPC .......... F16M 13/02; B63B 17/00; E02B 3/06; A45F 3/24
USPC ...... 114/343, 365, 381; 405/284, 272, 258.1
See application file for complete search history.

(56) References Cited

U.S. PATENT DOCUMENTS

| | | | |
|---|---|---|---|
| 1,391,112 A * | 9/1921 | Hinzman | A47B 23/025 |
| | | | 248/447.2 |
| 2,584,713 A * | 2/1952 | Kanaval | G09F 7/18 |
| | | | 40/607.04 |
| 3,266,761 A | 8/1966 | Walton et al. | |
| 3,832,910 A * | 9/1974 | Bryant | B65G 23/44 |
| | | | 474/136 |
| 5,172,745 A * | 12/1992 | Wang | B60J 1/2013 |
| | | | 160/265 |
| 5,295,646 A | 3/1994 | Roth | |
| 6,023,792 A | 2/2000 | Croucher et al. | |
| 6,695,336 B1 | 2/2004 | Grabenstetter | |
| 6,701,913 B1 | 3/2004 | LeDuc et al. | |
| 7,516,922 B1 | 4/2009 | Kirschner | |
| 8,485,207 B1 | 7/2013 | Boyington | |
| 8,602,440 B2 | 12/2013 | Kenjora | |
| 9,173,387 B2 * | 11/2015 | Rupp | B63B 17/00 |
| 2003/0205599 A1 | 11/2003 | Brown | |
| 2013/0333271 A1* | 12/2013 | Rupp | A01K 91/08 |
| | | | 43/27.4 |

(Continued)

*Primary Examiner* — Lawrence Averick
(74) *Attorney, Agent, or Firm* — Poznak Dyer Kanar Schefsky Thompson PLC

(57) ABSTRACT

An accessory attachment interface includes a member having a tubular portion and a flange portion. The tubular portion defines a bore and the flange portion defines first and second flanges. The first and second flanges are coplanar with each other and with a plane that is tangential to the tubular portion. The first and second flanges cooperate with each other to define a substantially planar surface at which the accessory attachment interface is mountable to various objects. The accessory attachment interface provides a common interface for mounting a variety of hardware and accessories to objects.

8 Claims, 15 Drawing Sheets

(56) References Cited

U.S. PATENT DOCUMENTS

2020/0298936 A1  9/2020  Fournier et al.

* cited by examiner

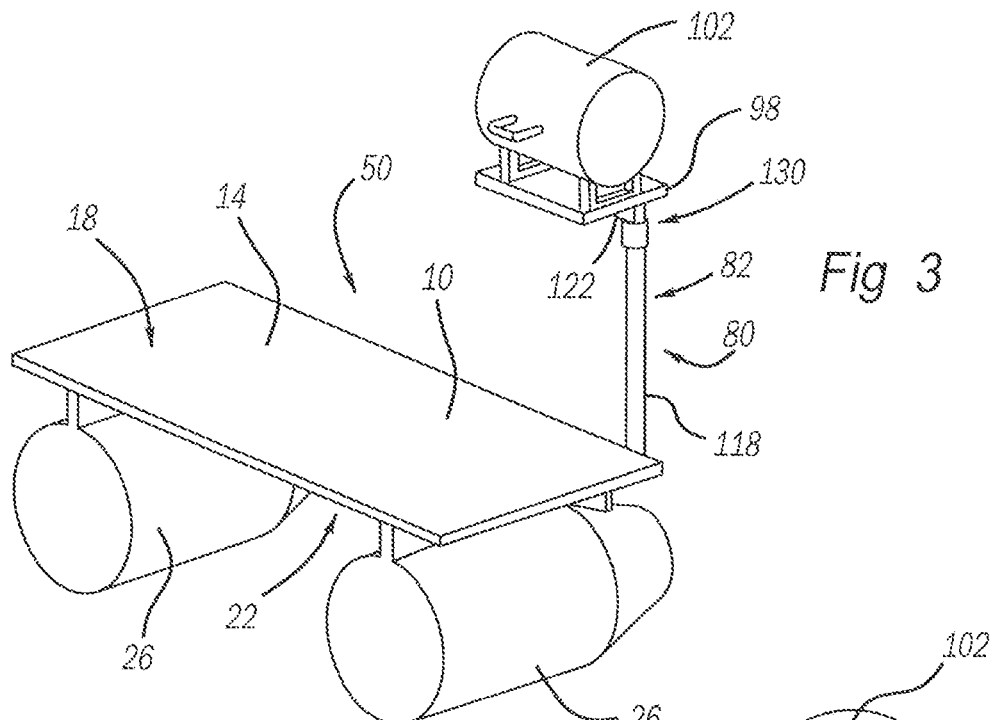
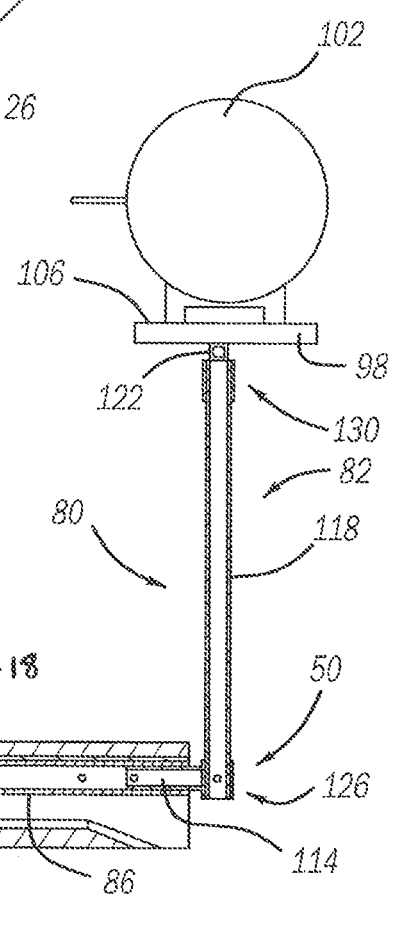

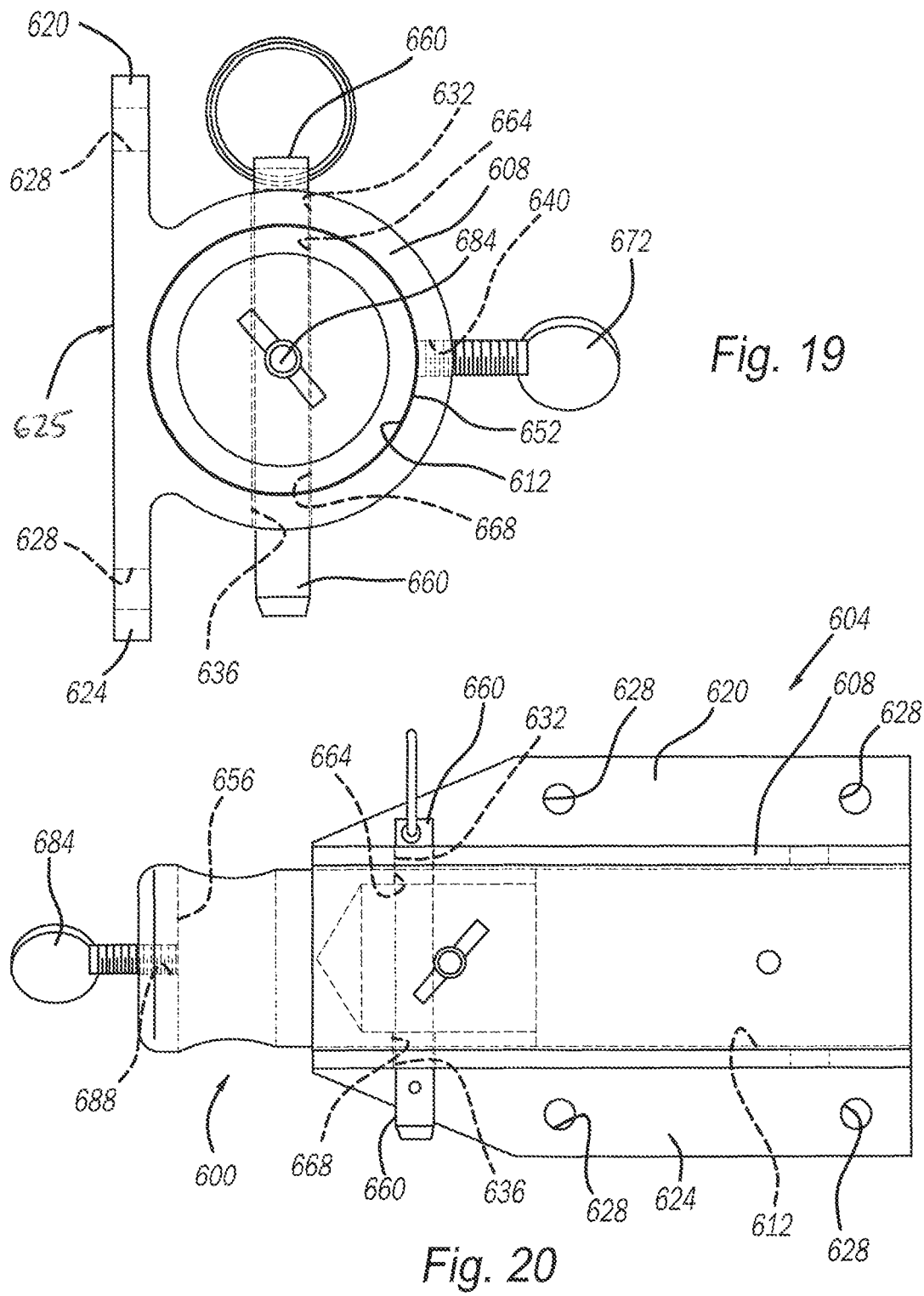

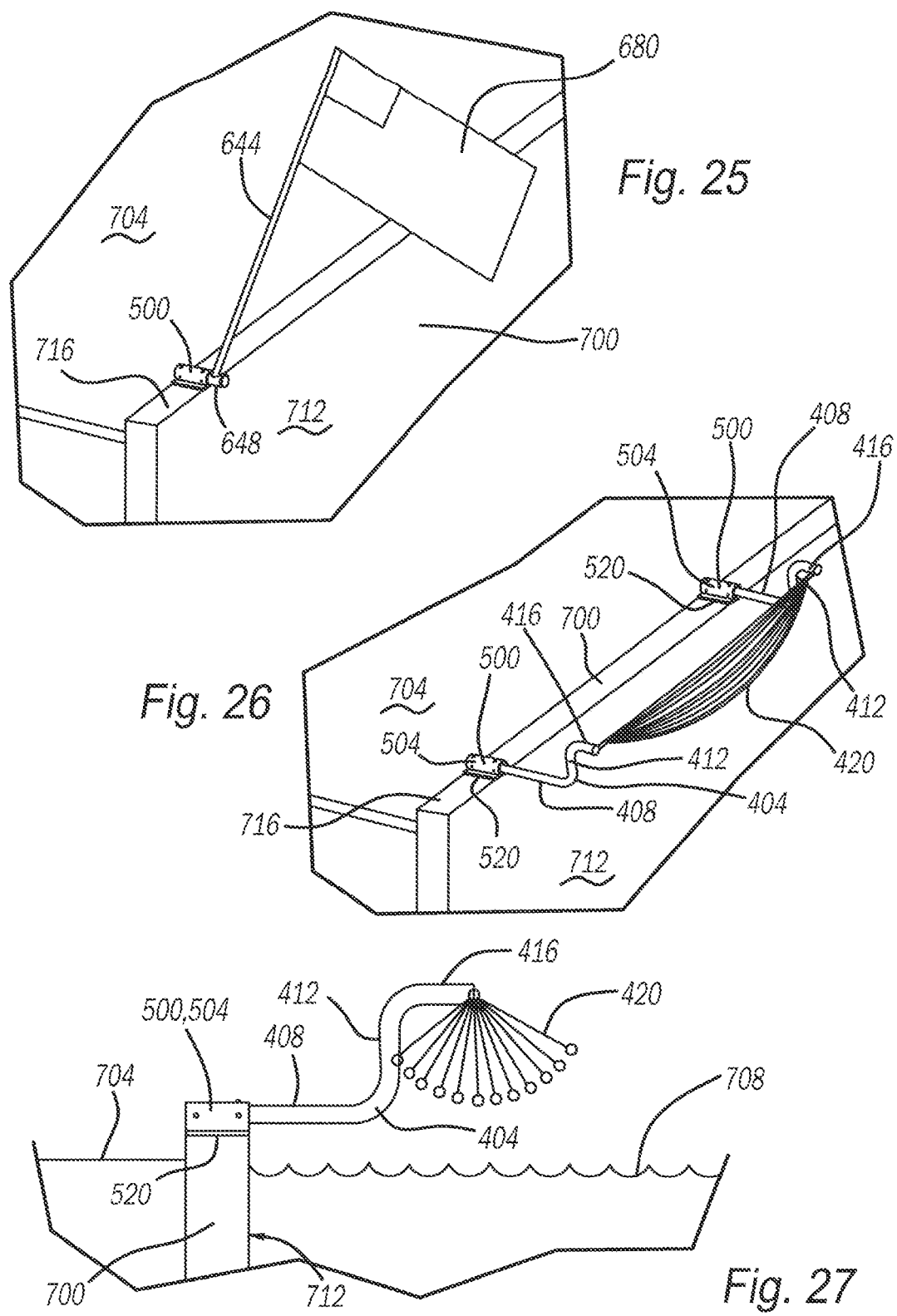

US 12,203,593 B2

ACCESSORY ATTACHMENT SYSTEM AND METHOD

CROSS-REFERENCE TO RELATED APPLICATION

This application is a continuation-in-part of U.S. patent application Ser. No. 17/850,634, filed Jun. 27, 2022, which claims the benefit of U.S. Provisional Patent Application No. 63/215,275, filed Jun. 25, 2021, and which is a continuation-in-part of U.S. patent application Ser. No. 17/696,604, filed Mar. 16, 2022, which claims the benefit of U.S. Provisional Patent Application No. 63/161,876, filed Mar. 16, 2021, each of which is hereby incorporated by reference in its entirety. This application also claims the benefit of U.S. Provisional Patent Application No. 63/307,444, filed Feb. 7, 2022, which is hereby incorporated by reference in its entirety.

TECHNICAL FIELD

This disclosure relates to devices for attaching accessories to features adjacent to a body of water.

BACKGROUND OF THE INVENTION

People often enjoy various recreational activities on or adjacent to bodies of water. The activities may involve or require the use of various devices or components that must be securely mounted prior to and during use.

SUMMARY

An accessory attachment system includes a first member having a tubular portion and a flange portion connected to the tubular portion. The tubular portion defines a bore and the flange portion defines first and second flanges. The first and second flanges are coplanar with each other and cooperate with each other to define a substantially planar surface at which the accessory attachment interface is mountable to various objects. The accessory attachment system provides a common interface for mounting a variety of hardware and accessories to objects. The system may include one or more accessories each having a respective second member that is selectively insertable into the bore to connect the accessory to the first member.

The accessory attachment system provides a common interface at which a plurality of various accessories are releasably mountable in a desired location. A method of using the attachment system with a seawall is provided.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 3 is a schematic, perspective view of a portion of the boat and accessory attachment system in the first configuration;
FIG. 4 is a schematic, cross-sectional, side view of a portion of the boat and the accessory attachment system in the first configuration;
FIG. 19 is a schematic, front view of the attachment interface and cylindrical member of FIG. 18;
FIG. 20 is a schematic, top view of the attachment interface and cylindrical member of FIG. 18;
FIG. 25 is a schematic, perspective view of the attachment interface of FIGS. 14-17 mounted to the seawall and engaged with the flagpole bracket of FIG. 18;
FIG. 26 is a schematic, perspective view of the seawall with two attachment interfaces mounted thereto, each of the attachment interfaces being engaged with the hammock assembly of FIGS. 10-13;
and
FIG. 27 is a schematic, side view of the seawall with the hammock assembly of FIG. 26.

DESCRIPTION OF THE PREFERRED EMBODIMENTS

Figure 1:
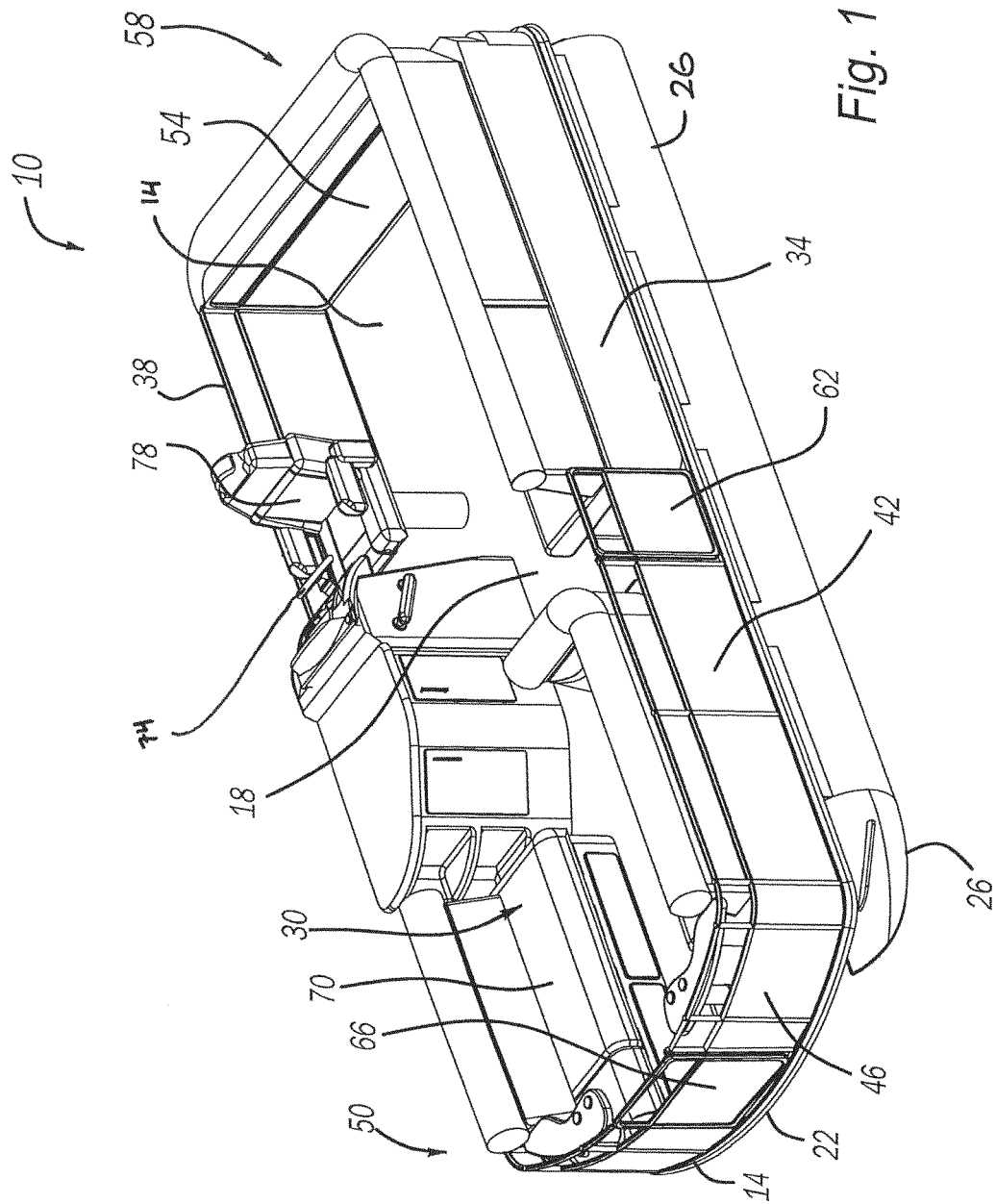
FIG. 1 is a schematic, perspective view of a pontoon boat.

Referring to the Figures, wherein like reference numbers refer to like components throughout, an attachment interface for attaching hardware and accessories to a watercraft or other mounting surfaces is schematically depicted. Referring specifically to FIG. 1, a pontoon boat 10 includes a platform or deck 14 having an upper surface 18 and a lower surface 22. The deck 14 is mounted with respect to pontoons 26, as understood by those skilled in the art. The upper surface 18 defines the floor of a passenger area 30. The pontoon boat 10 includes fencing 34 mounted to the deck 14 and extending upward from the upper surface 18.

The fencing 34 includes side portions 38, 42 that extend fore and aft or longitudinally along respective sides of the upper surface 18. The fencing 34 also includes a forward portion 46 at or adjacent to the bow 50. The forward portion 46 is generally perpendicular to, and interconnects, the side portions 38, 42. A rear portion 54 of the fencing 34 is at or adjacent to the stern 58. The rear portion 54 is generally perpendicular to, and interconnects, the side portions 38, 42. In the embodiment depicted, one of the side portions 42 includes a gate 62. Similarly, the forward portion 46 includes a gate 66.

The fencing 34 surrounds the passenger area 30, which may include seating assemblies 70, a steering wheel 74, a captain's chair 78, etc. The pontoon boat 10 may include a selectively retractable awning or canopy (not shown) as understood by those skilled in the art.

FIGS. 2-7, wherein like reference numbers refer to like components from FIG. 1, schematically depict an accessory attachment interface for use with the boat 10. In FIGS. 2-7, only the pontoons 26 and deck 14 of the boat 10, along with a receiver 86 and accessory attachment system 80, are shown for clarity and simplicity. Referring to FIGS. 2-7, the receiver 86 includes a tubular portion 88 and a flange portion 90; in the embodiment depicted, the tubular portion 88 is cylindrical, though other shapes may be employed within the scope of the claimed invention. The flange portion 90 defines a plurality of holes for mounting the receiver 86 to a surface of the boat 10 with fasteners. In the embodiment depicted, the receiver 86 is mounted to the lower surface 22 of the deck 14. In the embodiment depicted, the boat 10 includes two receivers 86 mounted under the deck 14 adjacent the bow; each receiver 86 is on a respective side of the boat 10.

Figure 2:
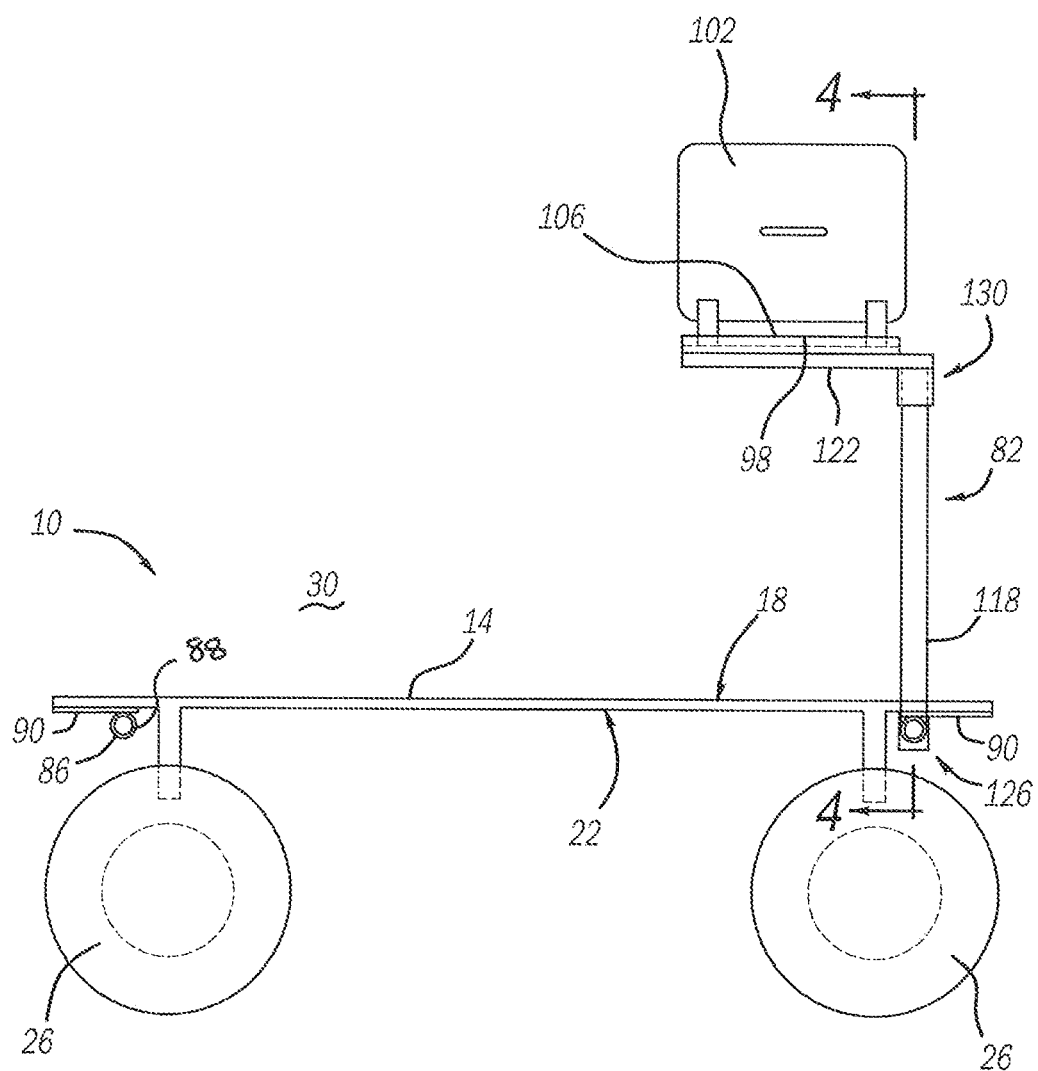
FIG. 2 is a schematic, cross-sectional, rear view of the boat of FIG. 1 with an accessory attachment system operatively connected thereto in a first configuration.

An accessory mounting system includes a mechanism 82 that is attachable to the boat 10 via one of the receivers 86. The mechanism 82 includes an accessory holding portion 98 at which an accessory, such as the grill 102 shown, is connectable to the mechanism 82 or supportable by the mechanism 82. In the embodiment depicted, the accessory holding portion 98 is a table member defining at least one planar surface 106 on which an accessory is supportable by the mechanism 82. The grill 102 is shown in FIGS. 2-4 being supported by surface 106.

Figure 5:
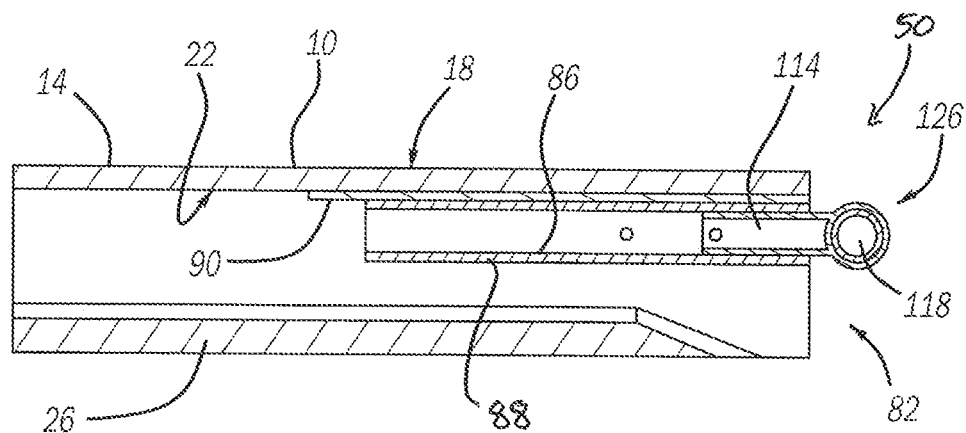
FIG. 5 is a schematic, cross-sectional, side view of a portion of the boat and the accessory attachment system in a second configuration.
Figure 6:
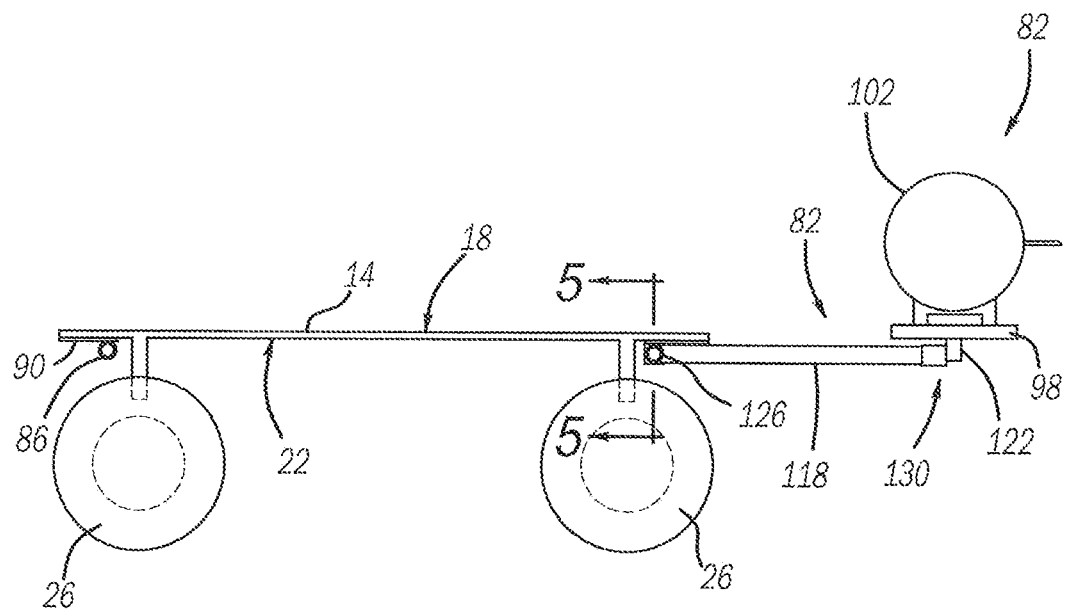
FIG. 6 is a schematic, rear view of the boat with the accessory attachment system in the second configuration.
Figure 7:
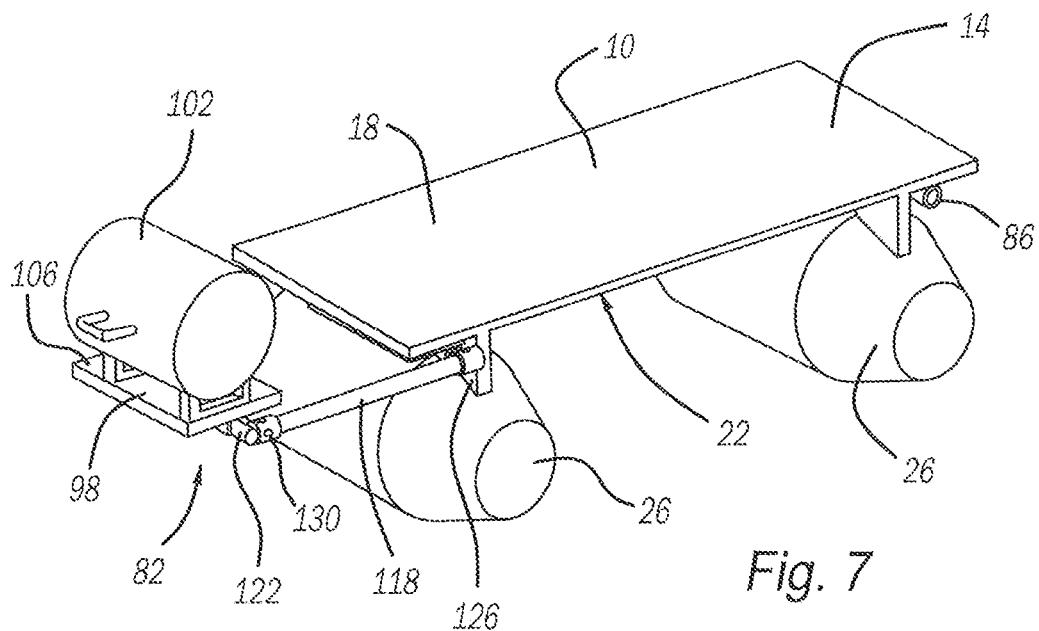
FIG. 7 is a schematic, perspective view of a portion of the boat with the accessory attachment system in the second configuration.

The mechanism 82 is reconfigurable such that the accessory holding portion 98 is selectively movable relative to the boat 10. For example, the mechanism 82 is reconfigurable between a first configuration, as shown in FIGS. 2-4, and a second configuration, as shown in FIGS. 5-7.

In the embodiment depicted, the mechanism 82 includes a first segment 114, a second segment 118, and a third segment 122. A first joint 126 interconnects the first and second segments 114, 118 such that the second segment 118 extends perpendicularly to the first segment 114. A second joint 130 interconnects the second and third segments 118, 122 such that the third segment 122 extends perpendicularly to the second segment 118.

The first joint 126 is configured such that the second segment 118 is selectively rotatable relative to the first segment 114 about an axis of rotation that extends along the centerline of the first segment. The second joint 130 is configured such that the third segment 122 is selectively rotatable relative to the second segment 118 about an axis of rotation that extends along the centerline of the second segment. The first segment 114 is insertable into one of the receivers 86 mounted to the underside of the deck 14 of the boat 10, and is selectively rotatable relative to the receiver 86.

Referring specifically to FIGS. 2-4, in the first configuration, the first segment 114 extends in the fore and aft direction (relative to the boat 10) from the receiver 86 to a point forward of the bow 50. The second segment 118 extends vertically forward of the bow 50, and the third segment 122 extends transversely or laterally with respect to the boat 10 (i.e., perpendicularly to both the first segment 114 and the second segment 118).

The accessory holding portion 98 is attached to the third segment 122, and the grill 102 is placed on one of the surfaces 106 of the accessory holding portion 98 to be supported in the position shown in FIGS. 2-4. In the first configuration, the attachment portion 98 is in a position to support the grill 102 where the grill 102 is usable by a person on the deck 14 in the passenger area 30. More specifically, the attachment portion 98 and therefore the grill 102, is above the deck 14 and the upper edge of the fencing 34 when the mechanism 82 is in the first configuration.

Referring to FIGS. 5-7, the mechanism is movable from the first configuration to the second configuration by rotating the first, second, and third segments 114, 118, 122 about the joints 126, 130 and/or rotating the first segment 114 relative to the receiver 86 such that the second segment 118 is substantially horizontal, and the attachment portion 98, and therefore the grill 102, are moved downward, rearward, and rightward relative to the boat from the first configuration. When the mechanism 82 is in the second configuration, the grill 102 is in a position for use by a person in the water adjacent the boat.

Accordingly, the accessory attachment system enables a user to place accessories in various positions relative to the boat. Other accessories attachable or supportable by the attachment portion 98 may include lights, speakers, fishing equipment, etc.

In the embodiment depicted, the joints 126, 130 are formed by collars into which the segments extend, and are lockable by inserting pins into aligned holes in the collars and the segments. However, other joint configurations that provide the same functionality may be employed within the scope of the claimed invention. For example, clamps may be employed to selectively lock segments relative to one another within the scope of the claimed invention. Similarly, the receiver 86 defines holes that align with holes in the first segment 114, such that the first segment 114 is lockable relative to the receiver 86 by extending pins through the holes in the receiver and first segment.

Figure 8:
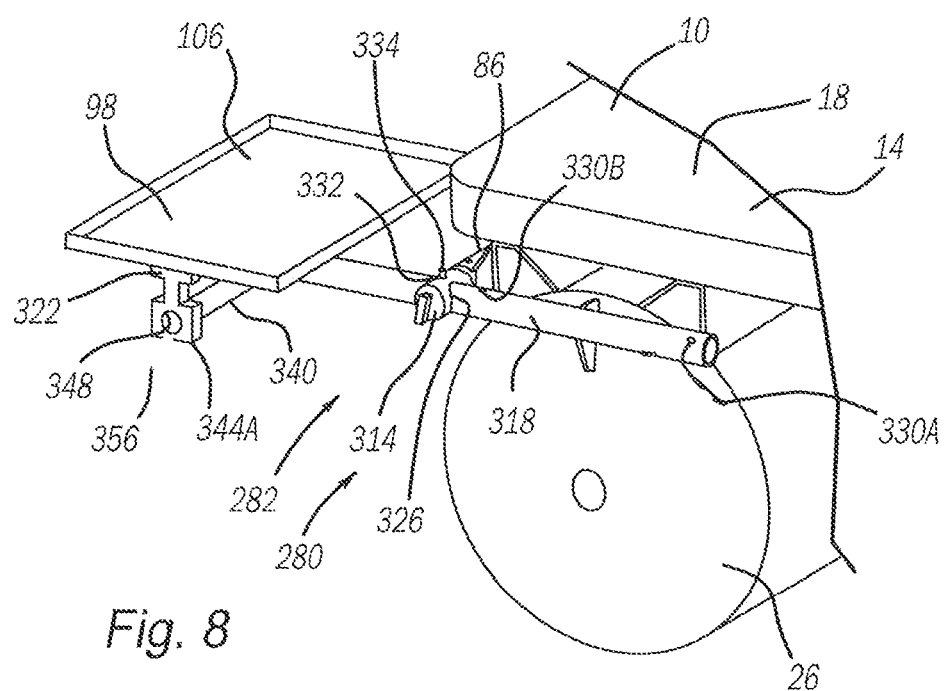
FIG. 8 is a schematic, perspective view of an alternative embodiment of an accessory attachment system within the scope of the claimed invention.
Figure 9:
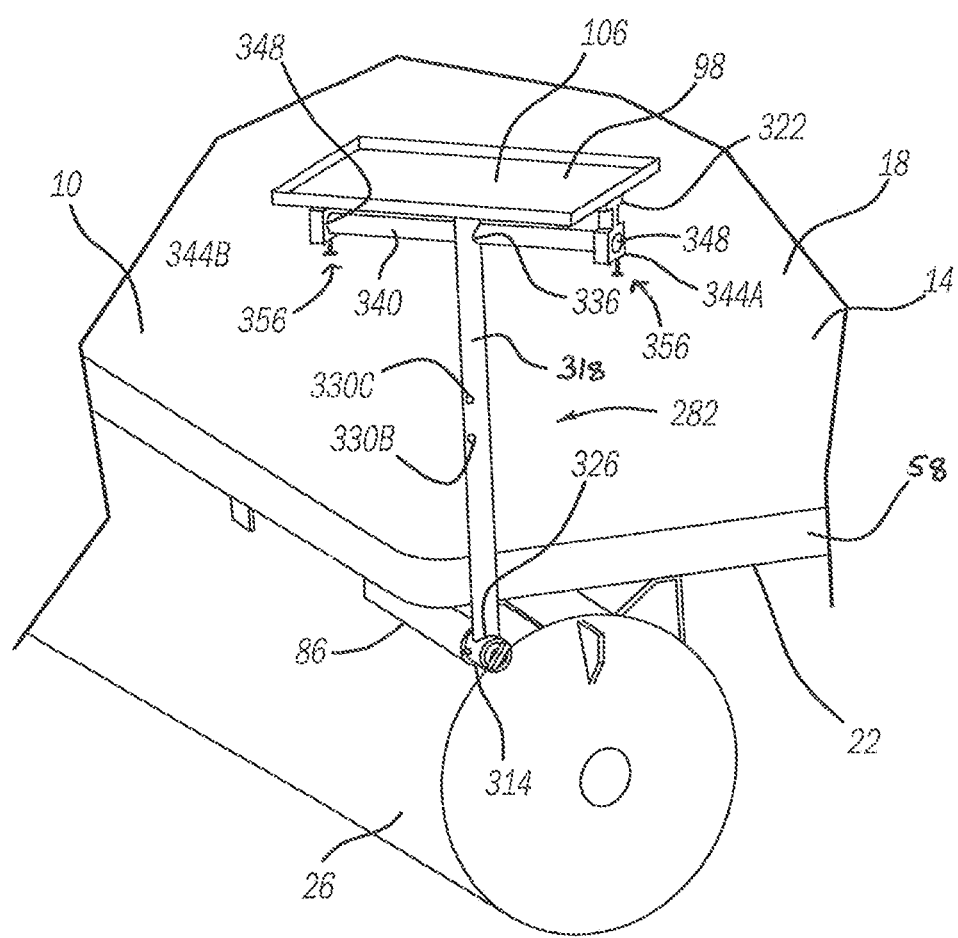
FIG. 9 is another schematic, perspective view of the accessory attachment system of FIG. 8.
Figure 10:
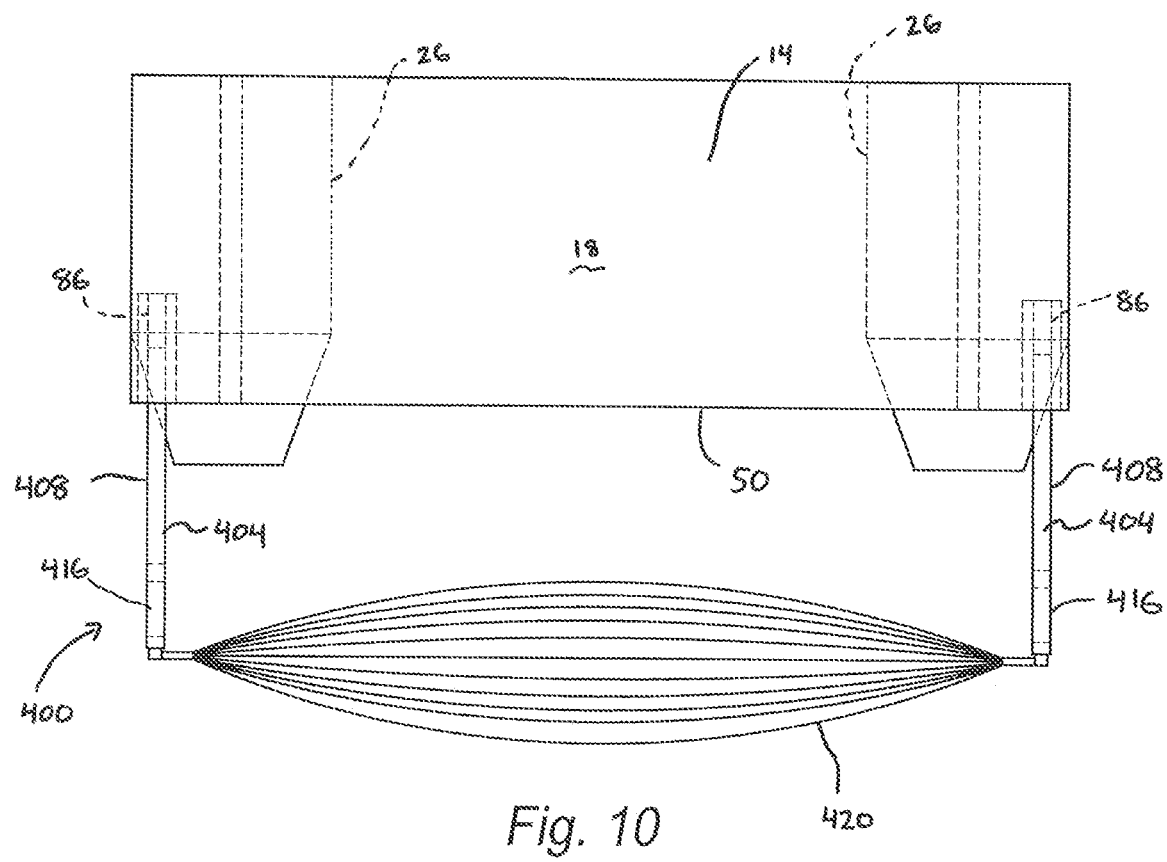
FIG. 10 is a schematic, top view of the boat with a hammock assembly mounted thereto.
Figure 11:
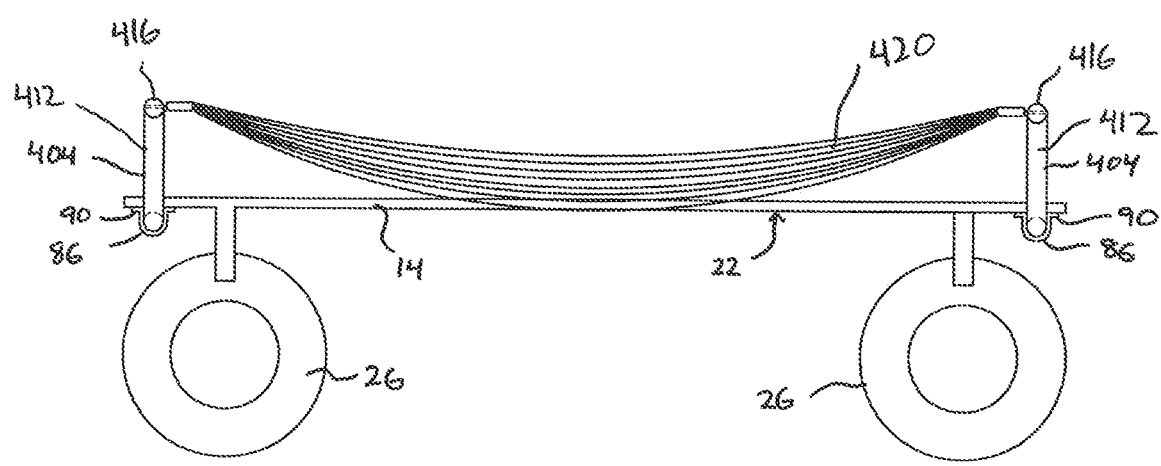
FIG. 11 is a schematic, front view of the boat with the hammock assembly mounted thereto.
Figure 12:
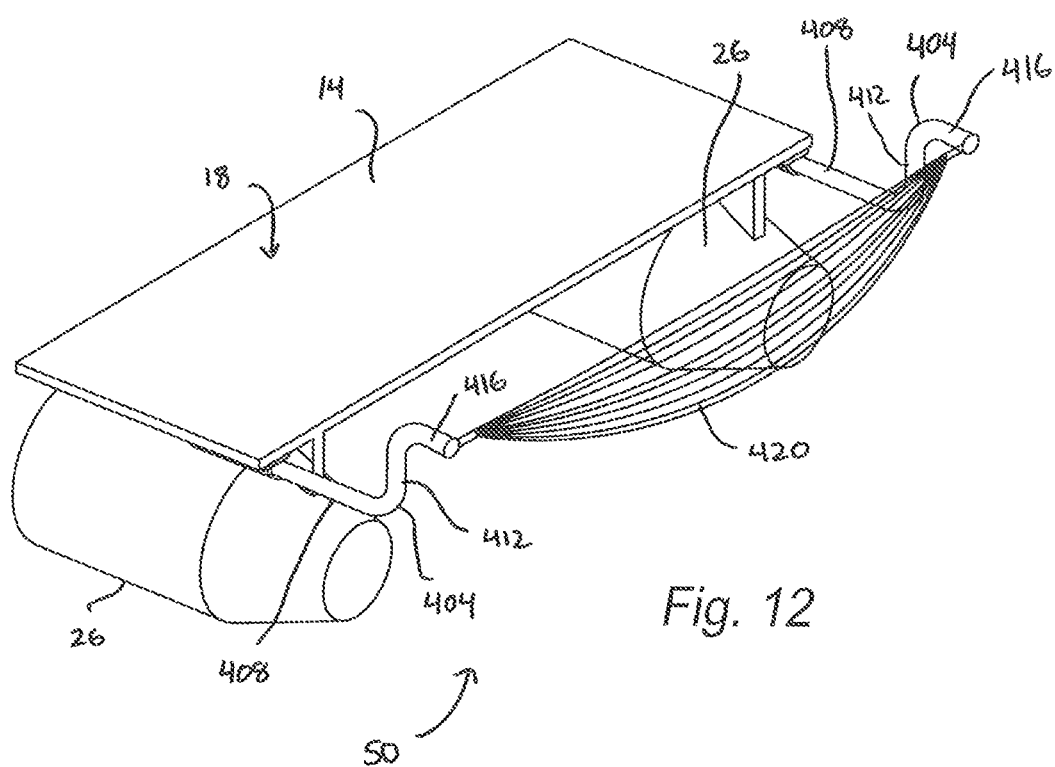
FIG. 12 is a schematic, perspective view of the boat with the hammock assembly mounted thereto.
Figure 13:
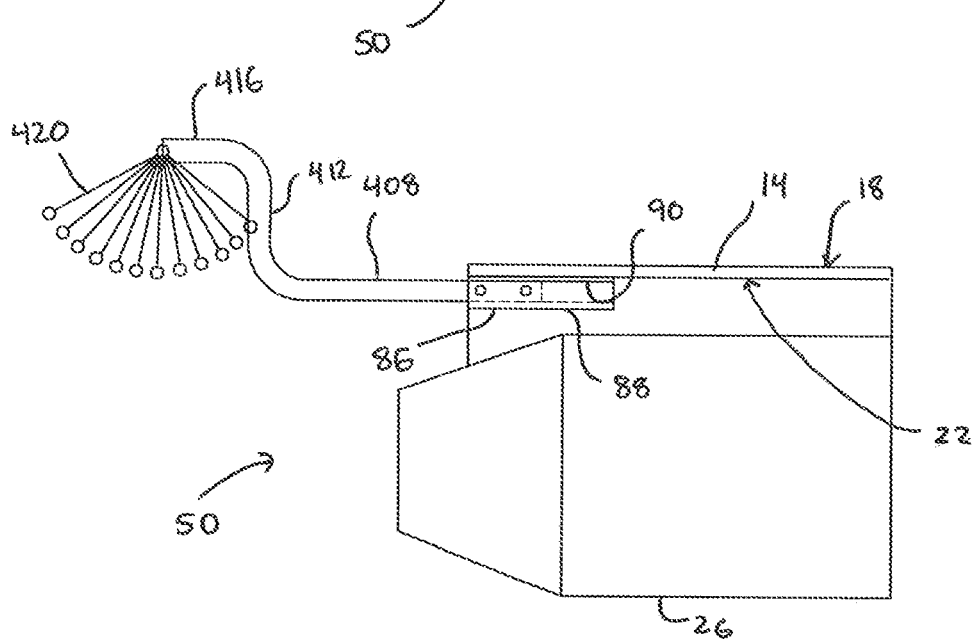
FIG. 13 is a schematic, side view of the boat with the hammock assembly mounted thereto.
Figure 14:
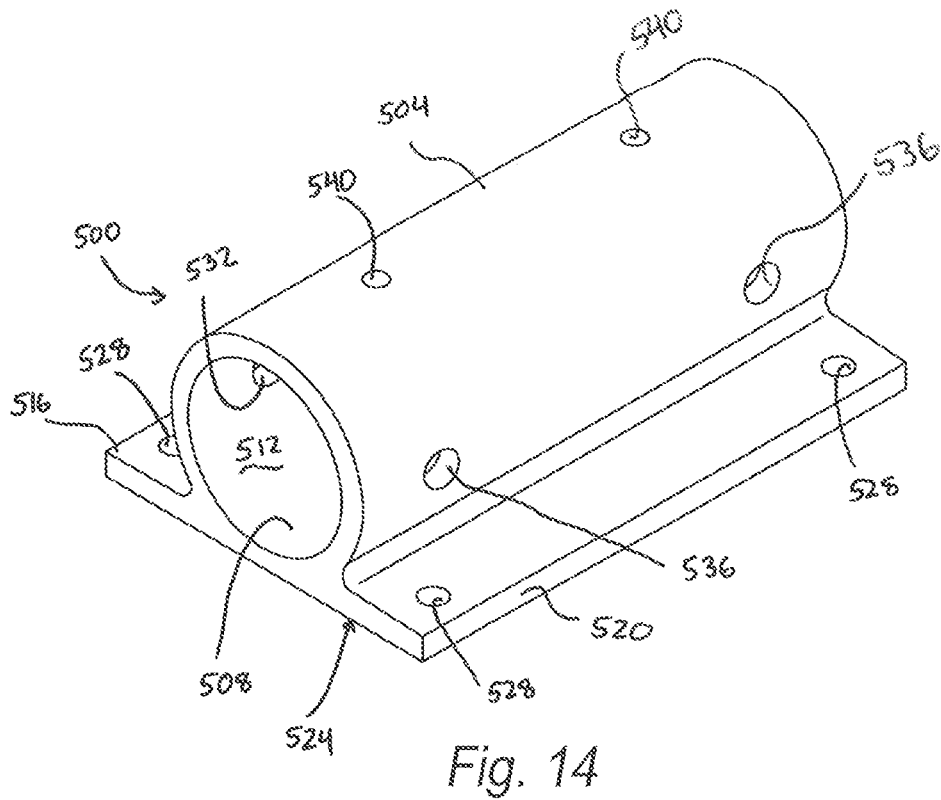
FIG. 14 is a schematic, perspective view of an attachment interface.
Figure 15:
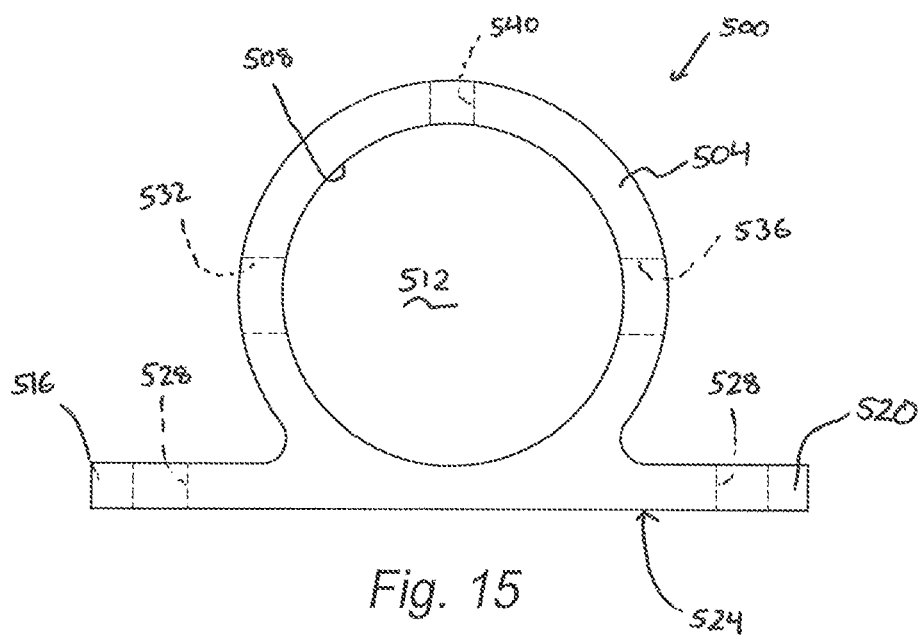
FIG. 15 is a schematic, front view of the attachment interface of FIG. 14.
Figure 16:
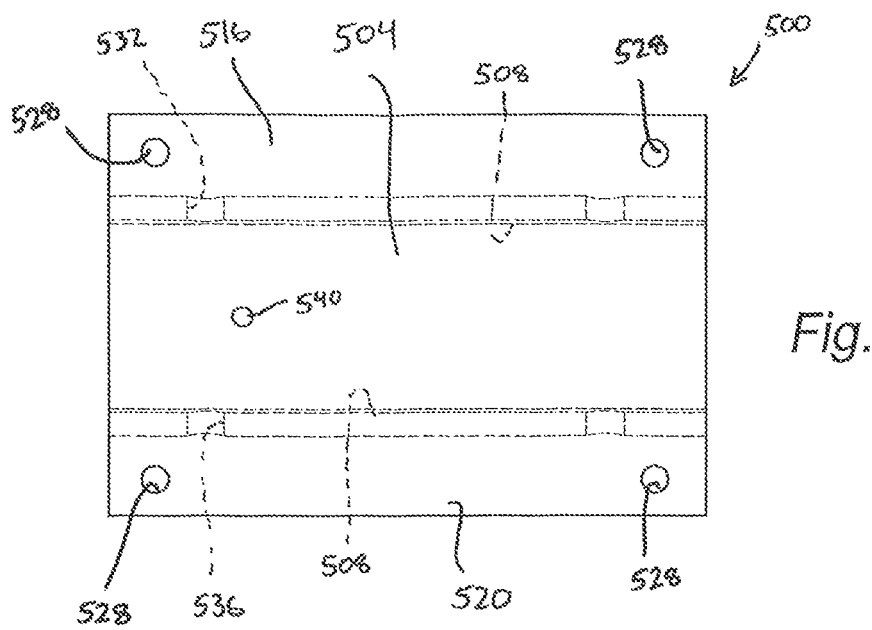
FIG. 16 is a schematic, top view of the attachment interface of FIG. 15.

FIGS. 8 and 9, wherein like reference numbers refer to like components from FIGS. 1-7, schematically depict another accessory attachment system 280 according to an alternative embodiment. In the embodiment depicted, the system 280 includes a mechanism 282 having a first segment 314, a second segment 318, and a third segment 322. The first segment 314 is cylindrical and is inserted into the receiver 86 in a manner similar to the first segment shown at 114 in FIGS. 2-7. In the embodiment shown in FIGS. 8 and 9, the receiver 86 is mounted below the deck 14 to a vertical surface on a bracket that interconnects one of the pontoons 26 to the deck 14 adjacent to the stern 58.

The first segment 314 is selectively rotatable relative to the receiver 86 and is selectively lockable via pins in the positions shown in FIGS. 8 and 9. The first segment 314 also defines a hole 326 that extends perpendicular to the centerline of the segment 314, i.e., the hole 326 extends through the width of the segment 314. The second segment 318 extends through the hole 326 such that the second segment 318 is perpendicular to the first segment 314. The outer diameter of the second segment 318 is slightly smaller than the diameter of the hole 326 such that the second segment 318 is slidable through the hole 326 relative to the first member 314.

The second segment 318 defines a plurality of holes 330A, 330B, 330C along its length. Hole 330A is near one end of the second segment 318, and holes 330B, 330C are near the midpoint of the second segment 318. The first segment 314 defines a hole 332 that extends from the outer surface into the hole 326. The second segment 318 is lockable relative to the first segment 314 by aligning one of the holes 330A, 330B, 330C with the hole 332 and then inserting a pin 334 through hole 332 and one of holes 330A, 330B, 330C.

The second segment 318 defines another hole 336 extending therethrough. Hole 336 is perpendicular to the centerline of the second segment 318. A cylindrical member 340 extends through the hole 336 such that the cylindrical member 340 is perpendicular to the second segment 318. The third segment 322 is rotatably connected to member 340 via two clamps 344A, 344B.

More specifically, each clamp 344A, 344B defines a respective cylindrical hole 348 through which member 340 extends so that the clamps 344A, 344B are rotatable about an axis that is coextensive with the centerline of the member 340 and perpendicular to the second segment 318. Each clamp 344A, 344B also includes a respective hand knob 356 that varies the clamping force exerted by the clamps 344A, 344B on the member 340. Accordingly, the rotation of clamps 344A, 344B, and therefore the rotation of the third segment 322, relative to the member 340 and segment 318, is prevented by rotating the hand knobs 356 in one direction to increase the clamping force on the member 340. If a user desires to alter the angular position of the third segment 322 relative to the member 340 and the second segment 318, the user may rotate the knobs 356 in the opposite direction to permit rotation of the third segment 322.

Accordingly, the clamps 344A, 344B permit fine adjustments to the angular position of the third segment 322. The accessory holding portion 98 is rigidly connected to the third segment 322 for unitary movement therewith, and thus the angular position of the accessory holding portion 98 is adjustable via the clamps 344A, 344B.

In FIG. 9, the first segment 314 is positioned relative to the receiver 86 and the boat 10 so that the second segment 318 is vertically oriented. The pin 334 extends through hole 330A, and thus the distance from the receiver 86 to the accessory holding portion 98 is maximized. The surface 106 faces upward to support a grill or other accessory.

In FIG. 8, the first segment 314 has been rotated ninety degrees relative to the receiver 86 from its position in FIG. 9. The second segment 318 has been slid through the hole 326 so that the pin 334 is inserted through hole 330C; accordingly, the distance between the receiver 86 and the accessory holding portion 98 has been shortened compared to FIG. 9. The third segment 322, and therefore the accessory holding portion 98, has been rotated about approximately ninety degrees relative to the second segment 318 from the position shown in FIG. 9 so that, despite the rotation of the second segment 318, the surface 106 maintains its upwardly-facing orientation.

FIGS. 10-13 schematically depict a portion of the boat 10 with another accessory attachment system 400 in accordance with the claimed invention. Referring to FIGS. 10-13, wherein like reference numbers refer to like components from FIGS. 1-9, the accessory attachment system 400 includes two bracket members 404. Each of the bracket members 404 extends partially into a respective one of the two receivers 86 mounted to the lower surface 22 of the deck 14, thereby securing each bracket member 404 relative to the boat 10.

In the embodiment depicted, each bracket member 404 includes a respective first segment 408, a respective second segment 412, and a respective third segment 416, though other bracket member configurations may be employed within the scope of the claimed invention. Each of the first segments 408 is cylindrical and is inserted into a respective one of the receivers 86 in a manner similar to the first segment shown at 114 in FIGS. 2-7. Each of the first segments 408 is secured to a respective receiver 86 by extending pins through the holes in the receiver and first segment 408. The first segments 408 extend from the receivers 86 substantially horizontally forward of the forward edge of the deck 14; the second segments 412 extends substantially vertically from the first segments 408; and the third segments 416 extend horizontally from the second segments 146.

The two bracket members 404 support an accessory, such as a hammock 420, therebetween. The hammock 420 comprises a flexible material, such as a fabric, and may be used to support a reclining human in the manner understood by those skilled in the art. The hammock 420 is attached to both of the bracket members 404 at their distal ends, i.e., at the ends of segments 416. Accordingly, the hammock 420 is suspended above the water forward of the bow 50 of the boat 10. The hammock 420 is supported by the two bracket members 404, i.e., one end of the hammock 420 is attached to one of the brackets 404, and the other end of the hammock 420 is attached to the other one of the brackets 404.

Those skilled in the art will recognize suitable hammock materials and configurations. For example, and without limitation, the hammock 420 may be a rope hammock, a mesh hammock, a cotton or other fabric hammock, etc. The hammock 420 may or may not include spreader bars.

It should be noted that the receivers 86 mounted to the underside of the deck 14 form an attachment interface at which a variety of differently-configured boating accessories and hardware may be mounted to the boat 10 in a manner that does not occupy any valuable space in the passenger area 30. Thus, an owner of the boat 10 with the receivers 86 installed may select from a plurality of different accessories adapted to engage with the receiver 86 and thus to the boat 10. For example, an owner may select and attach the accessory mounting system shown at 82, the attachment system shown at 400, the docking system shown and described in U.S. Patent publication number 2021/0331770, or the docking system shown and described in U.S. Patent publication number 2022/0177085 to the boat 10 via the receivers 86. U.S. Patent publication number 2021/0331770, published on Oct. 28, 2021, is hereby incorporated by reference in its entirety. U.S. Patent publication number 2022/0177085, published on Jun. 9, 2022, is hereby incorporated by reference in its entirety.

The receiver 86 in the embodiment of FIGS. 1-13 is formed from two pieces, namely a plate that forms the flange portion 90, and the tubular portion 88, which is welded to the plate. FIGS. 14-17, wherein like reference numbers refer to like components from FIGS. 1-13, schematically depict a receiver 500 according to an alternative embodiment that may be used in place of the receivers shown at 86. Referring to FIGS. 14-17, the receiver 500 includes tubular portion 504 having an inner surface 508 that defines a cylindrical bore 512.

The receiver 500 also includes two flanges 516, 520 that are connected to the tubular portion 504. The flanges 516, 520 are coplanar with each other and coplanar with a plane that is substantially tangential to the tubular portion 504. The flanges 516, 520 cooperate to define a flat, substantially planar surface 524 for mounting the tubular portion 504 to a flat surface, e.g. the lower surface 22, of the boat 10, and thus eliminate the need for the plate shown at 90.

The flanges 516, 520 define a plurality of holes 528 through which threaded fasteners may extend to attach the receiver 204 to the boat, and more specifically such that surface 524 abuts a surface of the boat 10. The tubular portion 504 also defines a plurality of holes 532, 536, 540. The receiver 500 is configured to operatively connect various hardware, such as the mechanism shown at 82 in FIGS. 1-7, the mechanism shown at 282 in FIGS. 8-9, the members shown at 404 in FIGS. 10-13, the docking systems shown in U.S. Patent Publications 2021/0331770 and 2022/0177085, to the boat 10. The receiver 500 thus provides a common attachment interface for a plurality of various hardware components, thereby providing a boat owner with a single attachment system for a wide variety of optional equipment.

Figure 17:
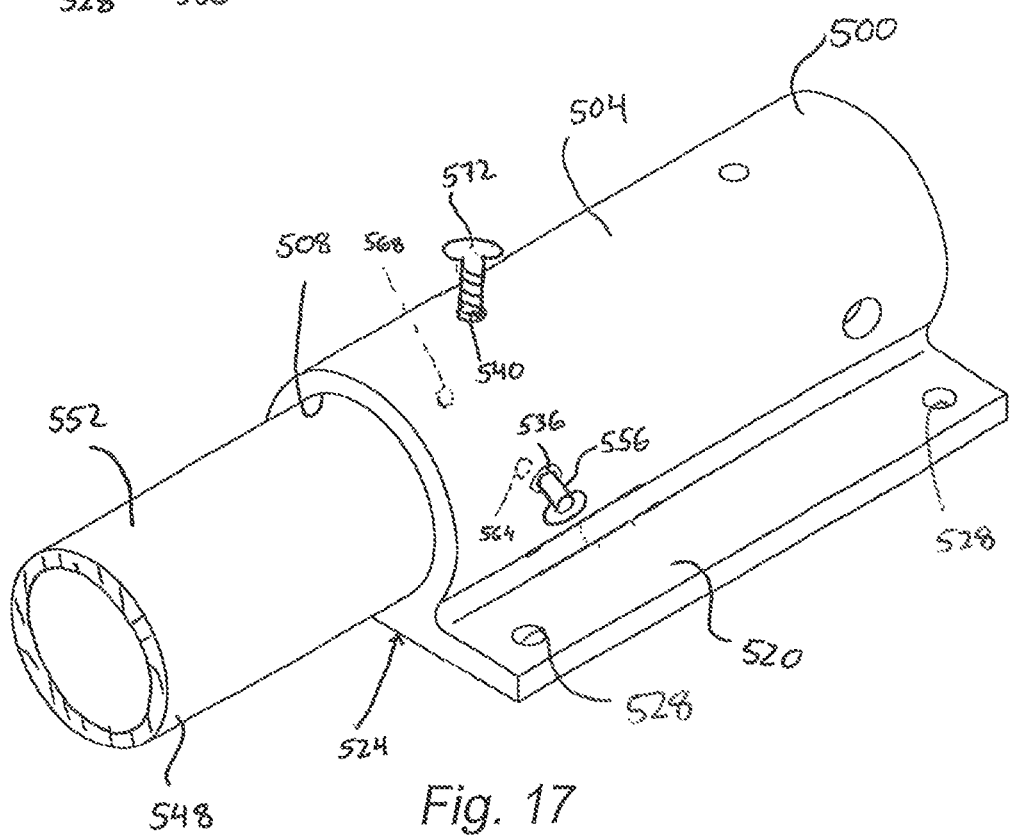
FIG. 17 is schematic, perspective view of the attachment interface of FIG. 15 engaged with a cylindrical member.

The receiver 500 is configured to receive a member 548 having a cylindrical outer surface 552. Member 548 is representative of segments 114, 314, and 408, and is therefore illustrative of the interaction between segments 114, 314, 408 and the receiver 500. The outer diameter of the member 548 is slightly less than the diameter of the bore 512, and thus, the member 548 is insertable into the bore 512 of the receiver 500 as shown in FIG. 17, with surface 552 contacting surface 508.

To retain the member 548 in the position shown relative to the receiver 500, a pin 556 is inserted through holes 532, 536 in the receiver 500 and through holes 564, 568 in the member 548, thereby preventing movement of the member 548 relative to the receiver 500. In the embodiment depicted, a set screw 572 extends through hole 540 so that the set screw 572 acts on the outer surface 552, further limiting relative movement of the member 548 relative to the receiver 500.

The receiver 500, including the tubular portion 504 and the flanges 516, 520, is formed from a single piece of material, such as aluminum. In the embodiment depicted, the receiver 500 is formed by extruding an aluminum blank into the shape shown and described. The receiver 500 provides improved durability and strength compared to the welding of a tube onto a plate, and provides flexibility in the manufacture of receivers of differing lengths.

It should be noted that, although the receivers 86, 500 are depicted mounted to a watercraft, such as boat 10, the receivers 86, 500 may be employed in other environments within the scope of the claimed invention. For example, and without limitation, two receivers 500 may be mounted to the upper surface of a seawall (shown at 700 in FIGS. 22-27). Brackets such as the ones shown at 404 may be engaged with the receivers 500 on the seawall such that a hammock is supported above the body of water adjacent to the seawall.

FIGS. 18-21, wherein like reference numbers refer to like components from FIGS. 1-17, schematically depict yet another accessory attachment system 600 including a receiver 604. Referring to FIGS. 18-21, the receiver 604 includes a cylindrical tubular portion 608 having an inner surface 612 that defines a cylindrical bore 616. The receiver 604 also includes two flanges 620, 624 that are connected to the cylindrical portion 608. The flanges 620, 624 are coplanar with each other and coplanar with a plane that is substantially tangential to the cylindrical portion 608. The flanges 620, 624 provide a flat surface 625 for mounting the cylindrical portion 608 to a flat surface 626 of the boat 10, and thus eliminate the need for the plate shown at 90.

The flanges 620, 624 define a plurality of holes 628 through which threaded fasteners may extend to attach the receiver 604 to the boat 10 or any other object or surface. The cylindrical portion 608 also defines a plurality of holes 632, 636, 640. The attachment system 600 is configured to operatively connect a flagpole 644 to the boat 10. The attachment system 600 in the embodiment depicted includes a member 648 having a cylindrical outer surface 652. The outer diameter of the member 648 is slightly less than the diameter of the bore 616, and thus, the member 648 is insertable into the bore 616 of the receiver 604 as shown in FIGS. 18-21, with surface 652 contacting surface 612.

Figure 21:
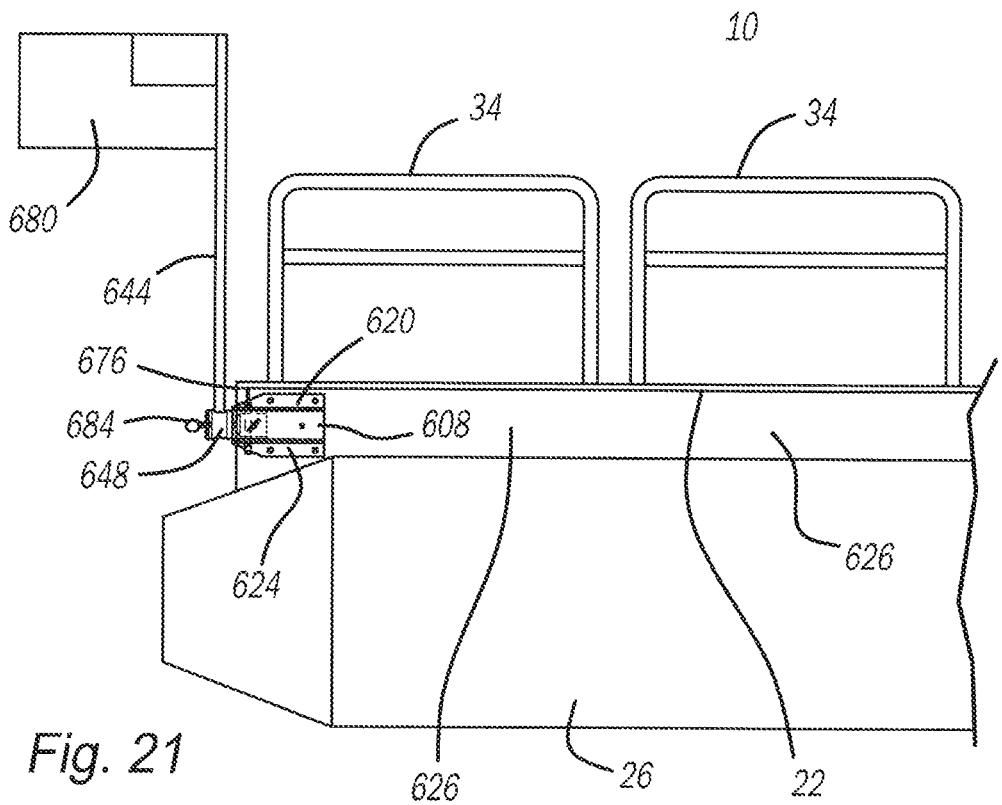
FIG. 21 is a schematic, side view of a boat having the attachment interface of FIG. 18 attached thereto and a flagpole engaged with the cylindrical member.

The member 648 also defines a hole 656 that extends perpendicular to the centerline of the member 648, i.e., the hole 656 extends through the width of the member 648. The hole 656 is sufficiently sized such that the bottom end of the flagpole 644 is insertable therein as shown in FIG. 21.

The member 648 is mountable to the receiver 604 such that a portion of the member 648 is within the bore 616, and hole 656 is outside the bore 616, as shown in FIGS. 18-21. To retain the member 648 in the position shown relative to the receiver 604, a pin 660 is inserted through holes 632, 636 in the receiver 604 and through holes 664, 668 in the member 648, thereby preventing movement of the member 648 relative to the receiver 604 and maintaining the hole 660 outside the bore 616.

In the embodiment depicted, a set screw 672 extends through hole 640 so that the set screw 672 acts on the outer surface 652, further limiting relative movement of the member 648 relative to the receiver 604. As shown in FIG. 21, surface 626 of the boat 10 is below the deck 14 and is vertically oriented. The flanges 620, 624 are in contact with the surface 626 and fasteners (such as the ones shown at 521) extend through the holes 628 to mount the receiver 604 to the surface 626 so that the receiver 604 is directly under the deck 14. The receiver 604 is positioned such that, when the member 648 is attached to the receiver 604, the member 648 extends past the rearward edge 676 of the deck 14 and the hole 656 is rearward of edge 676.

A user of the boat 10 may then attach a flagpole 644 with a flag 680 attached thereto to the boat 10 via the member 648. More specifically, the hole 656 is vertically oriented and upwardly open, and the lower end of the flagpole 644 is insertable into the hole 656 so that the flagpole 644 is substantially vertical as shown. Another set screw 684 extends into the hole 656 through a threaded aperture 688 in the member 648. The set screw 684 is rotatable to exert a clamping force on the flagpole 644 when the flagpole 644 extends into the hole 656, thereby retaining the flagpole 644 relative to the member 648.

Figure 22:
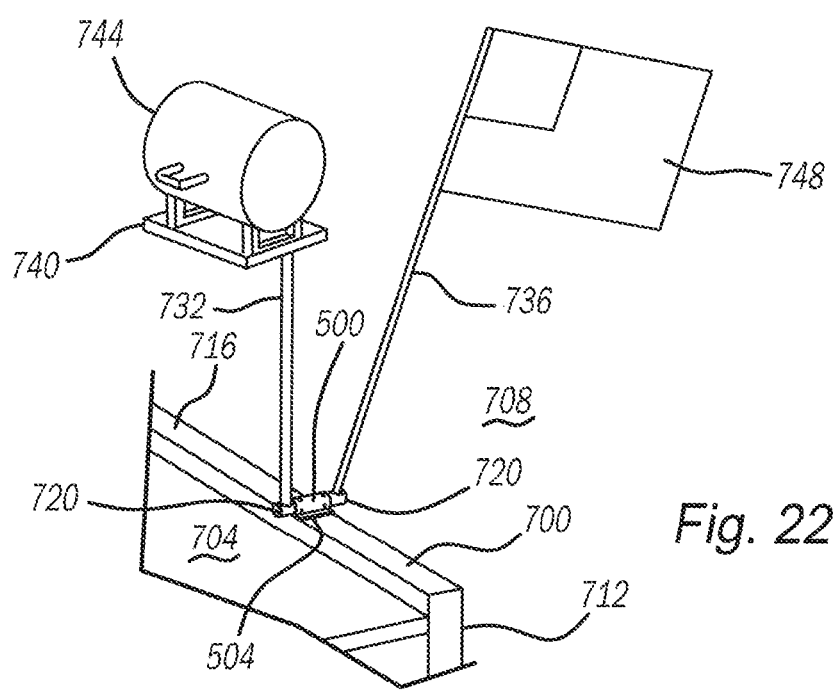
FIG. 22 is a schematic, perspective view of the attachment interface of FIGS. 14-17 mounted to a seawall and supporting a flag and a grill.
Figure 23:
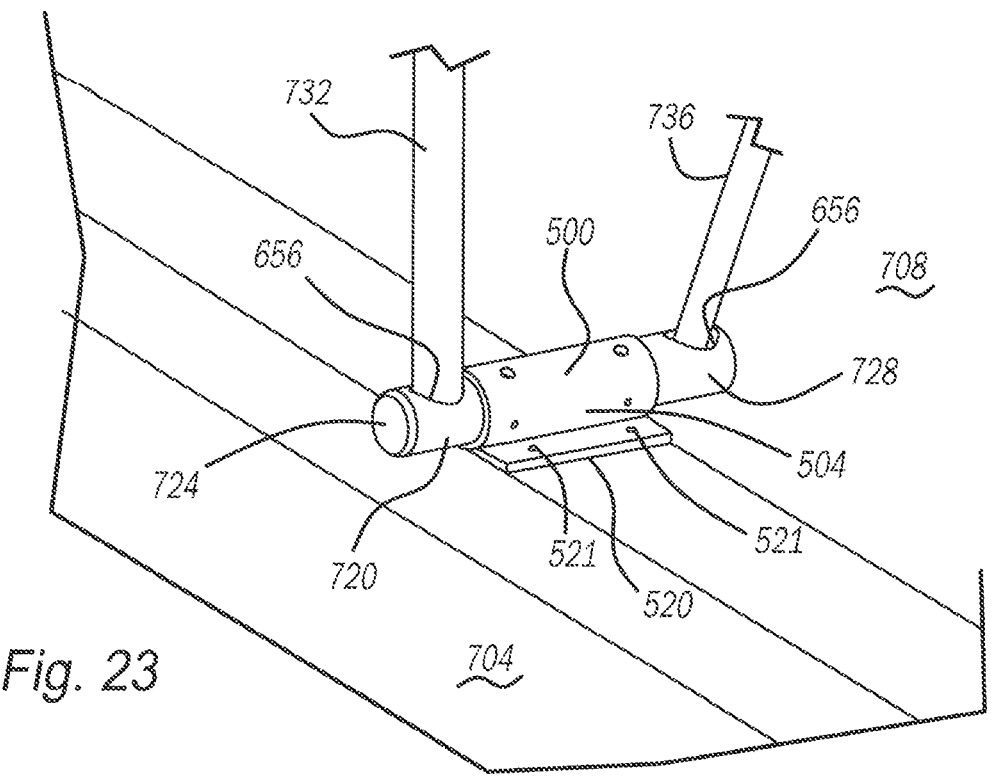
FIG. 23 is another schematic, perspective view of the attachment interface of FIG. 22 attached to the seawall.

The receivers 86, 500, 604 may be advantageously employed in environments not directly related to boats. For example, FIGS. 22-25, wherein like reference numbers refer to like components from FIGS. 1-21, schematically depict the receiver 500 attached to the upper surface of a seawall to support various accessories. Referring specifically to FIGS. 22 and 23, a seawall 700 separates dry land 704 and a body of water 708. The seawall 700 in the embodiment depicted includes a substantially vertical surface 712 that faces and contacts the water 708, and a substantially flat, horizontal, upwardly-facing top surface 716.

The receiver 500 is mounted to the seawall 700 at the top surface 716. More specifically, the surface 508 of the receiver contacts the top surface 716, and threaded fasteners 521 extend through holes 528 and into the seawall 700 to mount the receiver 500. The cylindrical tubular portion 504 is arranged so that the cylindrical bore has an opening in the direction of the water 708 and an opening in the direction of the land 704. It should be noted that, although threaded fasteners 521 are used in the embodiment depicted, other fastening techniques may be employed within the scope of the claimed invention to connect the receiver 500 to the seawall 700, including but not limited to clamps that engage the flanges.

In FIGS. 22 and 23, a cylindrical member 720 extends through the bore 512 so that a first end 724 protrudes from one end of the cylindrical portion 504 and a second end 728 extends from the other end of the cylindrical portion 504. Member 720 is substantially similar to member 648, except that member 720 defines a hole 656 at each end 724, 728, rather than at only one end. Thus, each hole 656 contains and supports a respective vertical support rod 732, 736 in the same manner as member 648 supports and retains flagpole 644. Rod 732 supports a table 740 having a grill 744 thereon. Rod 736 functions as a flagpole with a flag 748 attached thereto.

Figure 18:
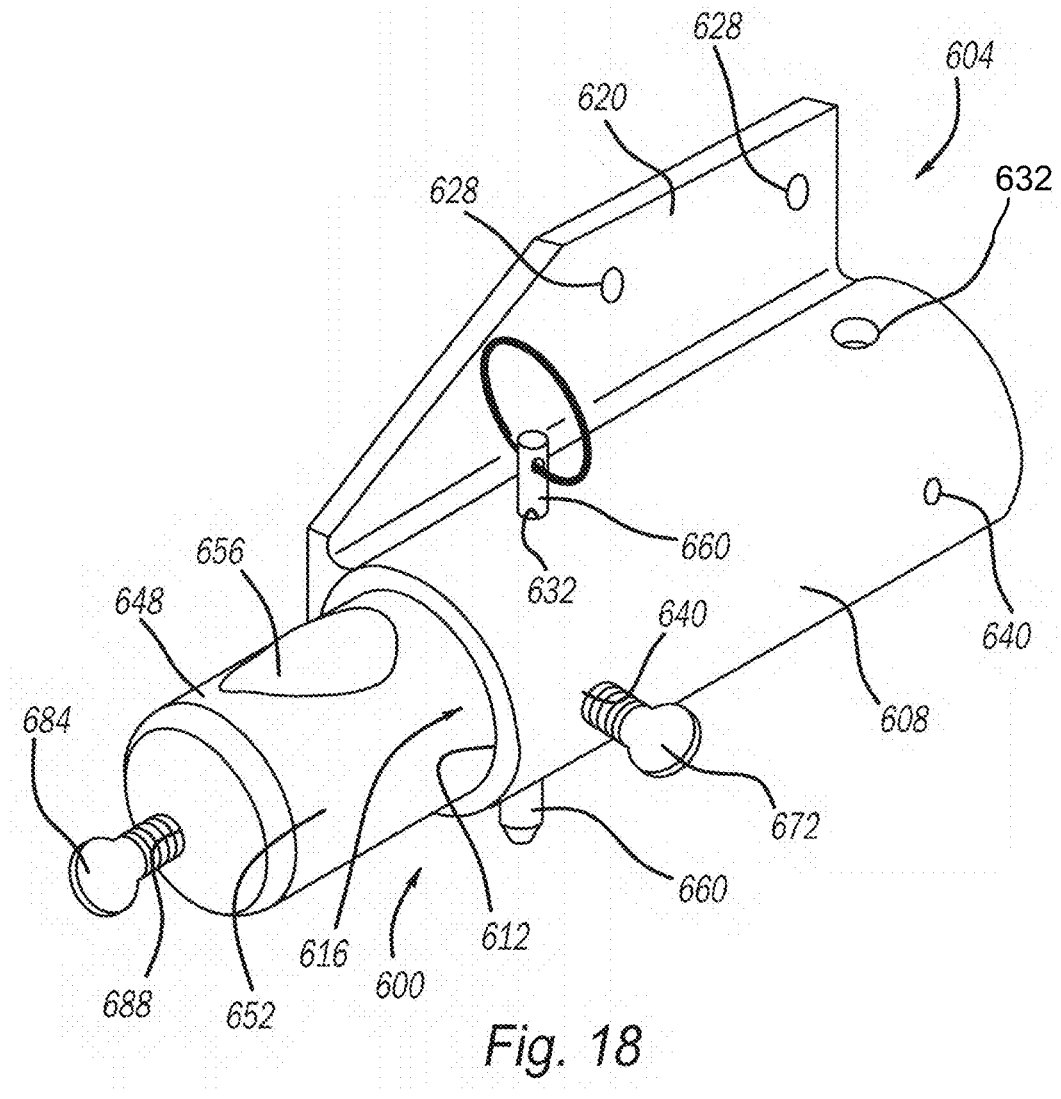
FIG. 18 is a schematic, perspective view of another attachment interface engaged with another cylindrical member forming a flagpole bracket.
Figure 24:
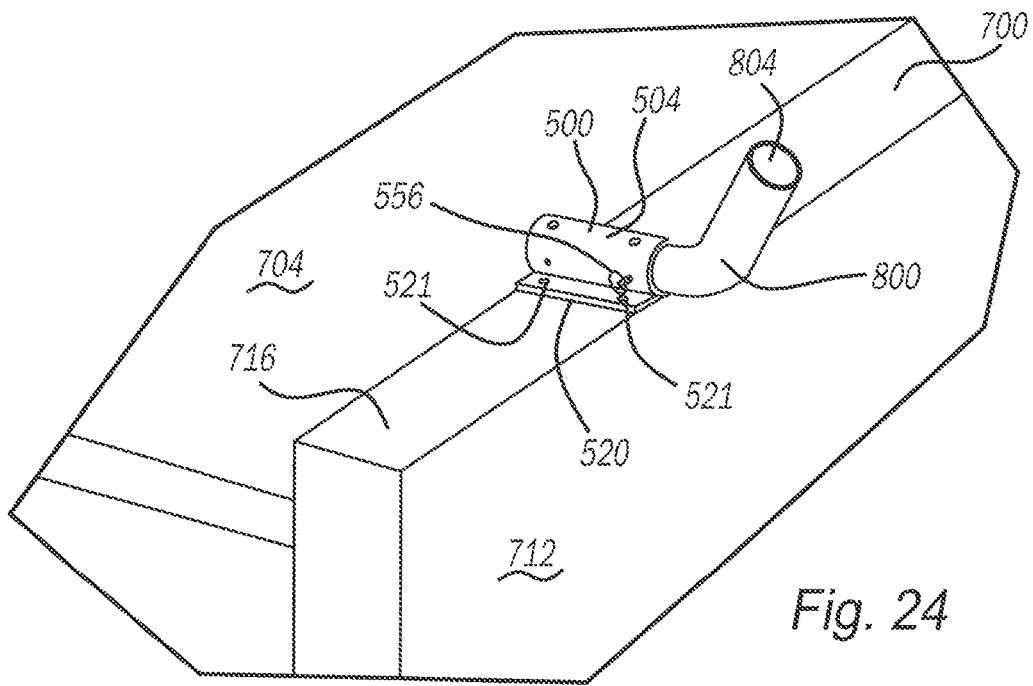
FIG. 24 is a schematic, perspective view of the attachment interface of FIGS. 14-17 mounted to the seawall and supporting a fishing pole holder.

Referring to FIG. 24, the receiver 500 is mounted to the seawall 700 as shown in FIGS. 17-19, but has a member 800 within the bore 510. The member 800 is a fishing pole holder defining an upwardly open cavity 804 in which the handle of a fishing pole is insertable to support the fishing pole over the water. It should be noted that receivers 500 and 604 include an extra set of holes for extending pins therethrough so that members can be inserted into bores from the openings at either end of the receiver 500, 604.

Referring to FIG. 25, the receiver 500 is mounted to the seawall 700 as shown in FIGS. 17-18, but is engaged with member 648 to support flagpole 644 and flag 680 above the water 708 as shown.

Referring to FIGS. 26 and 27, two receivers 500 are mounted to the seawall at upper surface 716, and the hammock assembly 400 of FIGS. 10-13 are engaged with the receivers 500. More specifically, each of the bracket members 404 extends partially into a respective one of the two receivers 500 mounted to the seawall 700, thereby securing each bracket member 404 relative to the seawall 700. The hammock assembly 400 is shown so that the hammock 420 is suspended over the body of water 708, but it should be noted that the bracket members 404 may also be inserted into the bores of receivers 500 through the opposite openings so that the hammock 420 is suspended over the land 704.

The receivers 500, 604 are substantially identical to one another except for the shapes of the flanges. The receivers 86, 500, 604 all form attachment interfaces at which various accessories, including but not limited to the mechanisms 82, 282 for holding a tray, the hammock assembly 400, the flagpole holder member 648, and the fishing pole holder 800, are connectable to another object including, but not limited to, the boat 10, the seawall 700, etc. Accordingly the receivers 86, 500, 604 enable a user to interchange accessories, or to select an accessory from an inventory of accessories for attachment to the object as desired, thereby providing significant flexibility to the user.

The receiver shown at 604 is representative of various features of the other receivers 86, 500. Each receiver 604 includes a tubular portion 608 and a flange portion connected to the tubular portion 608. The tubular portion 608 has an inner surface 612 that defines a bore 616. In the embodiment depicted, the bore 616 is cylindrical, though other bore shapes may be employed within the scope of the claimed invention. The flange portion defines first and second flanges 620, 624 that are coplanar with each other and cooperate with each other to define a substantially planar surface 626.

Each of the accessories 82, 282, 400, 648, 800 includes a respective second member having a segment that is selectively insertable into the bore 616. The segment of 648 that extends into the bore 616 is representative of the segments of accessories 82, 282, 400, 648, 800.

Each of the flanges 620, 624 defines at least one hole through which a respective fastener, such as the screws shown at 521 in FIGS. 23 and 24, are extendable to connect the receiver 600 to the surface such as part of the boat 10 or seawall surface 716. The tubular portion 608 defines an outer surface, and a first hole 632 that extends from the outer surface to the bore 616. The second member 648 defines a second hole 664. The segment of the second member 648 is selectively insertable into the bore 616 such that the first hole 632 and the second hole 664 are aligned with one another so that a fastener, such as pin 660, is insertable through both holes 632, 664 to retain the second member 648 relative to the receiver 600.

In the embodiment depicted, the tubular portion 608 defines a third hole 636 and a fourth hole 640. The third hole 636 is aligned with the first hole 632 such that the fastener is insertable through the first, second, and third holes 632, 664, 636 as shown in FIGS. 19-20. Set screw 672 extends through the fourth hole 640 and into the bore 616 to selectively apply a compressive force on the member 648.

The member 648 defines a hole 656 that is outside the bore 616. Set screw 684 extends into the hole 656 and is configured to selectively apply a compressive force on pole 644 when the pole 644 extends into the hole 656.

Each of the members shown in FIGS. 22-27 are connected to the receiver 500 in the same manner that member 648 is connected to the receiver 604, i.e., by extending a pin through the holes and tightening the set screw.

While the best modes for carrying out the invention have been described in detail, those familiar with the art to which this invention relates will recognize various alternative designs and embodiments for practicing the invention within the scope of the appended claims.

The invention claimed is:
1. An accessory attachment system comprising:
 a first member having a tubular portion and a flange portion connected to the tubular portion;
 wherein the tubular portion defines a bore;
 wherein the flange portion defines first and second flanges;
 wherein the first and second flanges are coplanar with each other and cooperate with each other to define a substantially planar surface;
 a second member having a segment that is selectively insertable into the bore;
 wherein the tubular portion defines an outer surface;
 wherein the tubular portion defines a first hole that extends from the outer surface to the bore;
 wherein the second member defines a second hole; and
 wherein the segment of the second member is selectively insertable into the bore such that the first hole and the second hole are aligned with one another.

2. The accessory attachment system of claim 1, wherein the first member, including the tubular portion and the first and second flanges, is formed from a single piece of material.

3. The accessory attachment system of claim 2, wherein the first member is aluminum and formed by extrusion.

4. The accessory attachment system of claim 1, wherein the tubular portion defines a third hole and a fourth hole;
   wherein the third hole is aligned with the first hole such that a fastener is insertable through the first, second, and third holes.

5. The accessory attachment system of claim 4, further comprising the fastener extending through the first, second, and third holes; and
   a set screw extending through the fourth hole.

6. The accessory attachment system of claim 1, wherein the second member defines a third hole that is outside the bore when the second hole is aligned with the first hole;
   wherein the accessory attachment system further comprises a pole that is insertable into the third hole.

7. The accessory attachment system of claim 6, further comprising a flag mounted to the pole.

8. The accessory attachment system of claim 7, further comprising a set screw being selectively rotatable relative to the second member and partially extending into the third hole.

\* \* \* \* \*